United States Patent [19]

Katsumata

[11] Patent Number: 5,118,734
[45] Date of Patent: Jun. 2, 1992

[54] WEATHER-RESISTANT POLYACETAL RESIN COMPOSITION AND WEATHER-RESISTANT MOLDED ARTICLES FORMED THEREOF

[75] Inventor: Toru Katsumata, Shizuoka, Japan

[73] Assignee: Polyplastics Co., Ltd., Osaka, Japan

[21] Appl. No.: 759,198

[22] Filed: Sep. 11, 1991

Related U.S. Application Data

[63] Continuation of Ser. No. 565,013, Aug. 10, 1990, abandoned.

[30] Foreign Application Priority Data

Aug. 10, 1989 [JP] Japan .................................. 1-207502

[51] Int. Cl.⁵ ................................................. C08K 5/34
[52] U.S. Cl. ....................................... 524/91; 524/102; 524/198; 524/288; 524/291; 524/359; 524/502; 524/512
[58] Field of Search ................. 524/91, 102, 198, 288, 524/291, 359, 502, 512

[56] References Cited

U.S. PATENT DOCUMENTS

| | | | |
|---|---|---|---|
| 4,278,589 | 7/1981 | Dexter et al. | 524/91 |
| 4,315,848 | 2/1982 | Dexter et al. | 524/91 |
| 4,446,263 | 5/1984 | Bryant | 524/102 |
| 4,596,847 | 6/1986 | Kasuga et al. | |
| 4,730,015 | 3/1988 | Ikenaga et al. | 524/99 |
| 4,731,397 | 3/1988 | Auerbach et al. | 524/512 |
| 4,760,119 | 7/1988 | Liotta et al. | |
| 4,975,478 | 12/1990 | Okuda | |

FOREIGN PATENT DOCUMENTS

| | | |
|---|---|---|
| 0127084 | 12/1984 | European Pat. Off. |
| 0244218 | 11/1987 | European Pat. Off. |
| 0300573 | 1/1989 | European Pat. Off. |
| 0356167 | 2/1990 | European Pat. Off. |

Primary Examiner—Krellion J. Morgan
Attorney, Agent, or Firm—Nixon & Vanderhye

[57] ABSTRACT

A weather-resistant polyacetal molding composition are comprised of a polyacetal base resin, and a weather-resistance effective amount of a stabilization package which includes (i) a weather stabilizer for the polyacetal base resin, (ii) an acrylic resin, and (iii) an oxyalkylene polymer comprised of repeating oxyalkylene units each having 2 to 8 adjacent carbon atoms.

11 Claims, No Drawings

WEATHER-RESISTANT POLYACETAL RESIN COMPOSITION AND WEATHER-RESISTANT MOLDED ARTICLES FORMED THEREOF

This is a continuation of application Ser. No. 07/565,013, filed Aug. 10, 1990, now abandoned.

FIELD OF INVENTION

The present invention relates to molding compositions of polyacetal resin and to molded articles formed thereof, exhibiting improved weather resistance properties. More specifically, the present invention relates to moldable weather-resistant polyacetal resin compositions which include a polyacetal base resin, a weather stabilizer, an acrylic resin and an oxyalkylene polymer.

BACKGROUND AND SUMMARY OF THE INVENTION

As is well known, polyacetal resins have conventionally been used in a number of fields as engineering plastics due to their excellent physical properties (such as desirable mechanical and electrical properties) and their excellent chemical properties (such as desirable chemical and heat resistance characteristics). However, polyacetal resins are required to have further property enhancements as new applications in which polyacetal resins may be used are identified. For example, further improvements are required in the weather resistance properties of polyacetal resins. In this regard, the interior and exterior parts of automobiles and parts for electric appliances tend to experience discoloration, loss of surface smoothness properties (resulting in decreased "gloss"), surface crack formation, and the like when subjected to the deleterious influence of their ambient conditions of use, such as solar rays, fluorescent lamps, rain and air.

It has been proposed to improve the weather resistance of polyacetal resins by incorporating various weather stabilizers in order to overcome the affects mentioned above. However, those instances in which a weather stabilizer is used are not always satisfactory. Although some beneficial weather-resistance can be obtained by adding a weather stabilizer and an acrylic resin to polyacetal base resins, the surface conditions (cracks, gloss, etc.) and the mechanical properties of moldings formed of such compositions are not always satisfactory after exposure to solar rays (ultraviolet rays), rain, and other "outdoor" conditions for prolonged time periods.

Increasing the amount of the weather stabilizer, acrylic resin or the like only results in minimal improvements in the weather-resistance properties of polyacetal resin compositions. In addition, an increase in the amount of such additives usually impairs the composition's otherwise desirable mechanical properties (e.g., tensile strength and Izod impact strength properties). Furthermore, UV-light stabilizers typically impart poor mold release properties to the composition and/or form deposits on the mold surface during molding, thereby reducing the dimensional accuracy and/or appearance of the moldings. As a result, an increase in the time needed to clean the mold increases thereby decreasing the efficiency of the molding operation. Further improvements in the weather stability characteristics of polyacetal reins are therefore still required.

Broadly, the present invention relates to moldable polyacetal molding compositions, and to molded articles formed thereof which include a polyacetal base resin and a weather stabilizing effective amount of a stabilization package comprised of (i) a weather (UV-light) stabilizer for polyacetal resin, (ii) an acrylic resin, and (iii) an oxyalkylene polymer comprised of oxyalkylene units having 2 to 8 carbon atoms.

A preferred polyacetal composition according to the present invention comprises (A) between 45 to 98.89 wt. % of a polyacetal base resin, (B) between 0.01 to 5 wt. % of a weather stabilizer, (C) between 1 to 40 wt. % of an acrylic resin and (D) between 0.1 to 10 wt. % (preferably 1 to 10% by weight) of an oxyalkylene polymer having 2 to 8 carbon atoms per oxyalkylene unit in the polymer chain.

DETAILED DESCRIPTION OF THE PREFERRED EXEMPLARY EMBODIMENTS

The polyacetal base resin that may be used in the present invention is a polymeric compound comprised principally of oxymethylene ($-CH_2O-$) groups and thus may be any polyoxymethylene homopolymer, or a polyoxymethylene copolymer, terpolymer and block copolymer containing a small amount of other constituent units in addition to the oxymethylene groups. The molecule of the polyacetal resin (A) may have either a linear structure as well as a branched or crosslinked structure. The degree of polymerization of the polyacetal base resin is not particularly limited, but is sufficiently large so that the resin is normally solid (e.g. molecular weights of up to 200,000).

Preferred weather (UV-light) stabilizers that may be used as the stabilizing component (B) according to the present invention include one or more compounds selected from the group consisting of (1) benzotriazoles, (2) benzophenones, (3) aromatic benzoates, (4) cyanoacrylics, (5) oxalanilides and (6) hindered amines.

Specific examples include:

(1) benzotriazoles:
2-(2'-hydroxy-5'-methylphenyl)-benzotriazole,
2-(2'-hydroxy-3',5'-di-t-butylphenyl)-benzotriazole,
2-(3,5-di-t-amyl-2-hydroxyphenyl)-benzotriazole,
2-(2'-hydroxy-3',5'-diisoamylphenyl)-benzotriazole,
2-[2-hydroxy-3,5-bis($\alpha,\alpha$-dimethyl-benzyl)phenyl]-benzotriazole and
2-(2'hydroxy-4'-octoxyphenyl)benzotriazole, (2) benzophenones:
2,4-dihydroxybenzophenone,
2-hydroxy-4-methoxybenzophenone,
2-hydroxy-4-octoxybenzophenone,
2-hydroxy-4-dodecyloxybenzophenone,
2,2'-dihydroxy-4-methoxybenzophenone,
2,2'-dihydroxy-4,4'-dimethoxybenzophenone,
2-hydroxy-4-methoxy-5-sulfobenzophenone and
2-hydroxy-4-oxybenzylbenzophenone, (3) aromatic benzoates:
p-t-butylphenyl salicylate and p-octylphenyl salicylate, (4) cyanoacrylates:
2-ethylhexyl 2-cyano-3,3'-diphenylacrylic and
ethyl 2-cyano-3,3'-diphenylacrylic, and (5) oxalanilides:
N-(2-ethylphenyl)-N'-(2-ethoxy-5-t-butylphenyl)oxalamide and N-(2-ethylphenyl)-N'-(2-ethoxyphenyl)oxalamide.

The hindered amines (6) usable herein are piperidine derivatives having a sterically hindered group, such as 4-acetoxy-2,2,6,6-tetramethylpiperidine,
4-stearoyloxy-2,2,6,6-tetramethylpiperidine, 4-acryloyloxy-2,2,6,6-tetramethylpiperidine,
4-methoxy-2,2,6,6-tetramethylpiperidine,
4-benzoyloxy-2,2,6,6-tetramethylpiperidine,
4-cyclohexyloxy-2,2,6,6-tetramethylpiperidine,
4-phenoxy-2,2,6,6-tetramethylpiperidine,
4-benzyloxy-2,2,6,6-tetramethylpiperidine,
4-(phenylcarbamoyloxy)-2,2,6,6-tetramethylpiperidine,
bis(2,2,6,6-tetramethyl-4-piperidyl)oxalate,
bis(2,2,6,6-tetramethyl-4-piperidyl)malonate,
bis(2,2,6,6-tetramethyl-4-piperidyl)adipate,
bis(2,2,6,6-tetramethyl-4-piperidyl)sebacate,
bis(1,2,2,6,6-pentamethylpiperidyl)sebacate,
bis(2,2,6,6-tetramethyl-4-piperidyl)terephthalate,
1,2-bis(2,2,6,6-tetramethyl-4-piperidyloxy)ethane,
   bis(2,2,6,6-tetramethyl-4-piperidyl)hexamethylene-1,6-dicarbamate,
bis(1-methyl-2,2,6,6-tetramethyl-4-piperidyl)adipate and tris(2,2,6,6-tetramethyl-4-piperidyl)benzene-1,3,5-tricarboxylate. High-molecular piperidine derivative polycondensates such as dimethyl succinate/1-(2-hydroxyethyl)-4-hydroxy-2,2,6,6-tetramethylpiperidine polycondensate are also usable.

The UV-light stabilizers are used alone or in combination of two or more of the same. Particularly, a combination of one or more of the stabilizers (1) to (5) noted above, with a hindered amine (6) is preferred.

The stabilizer component (b) is preferably used in an amount between 0.01 to 5% by weight, and particularly between 0.02 to 3% by weight, based on the entire weight effective composition. When an insufficient amount of the stabilizer component is employed, the stabilizing effects thereof are not obtained. On the other hand, an excessive amount of stabilizer is economically disadvantageous and may deleteriously affect the resin's mechanical properties and/or stain the mold.

The acrylic resins usable in the present invention include homopolymers of acrylic acid and its esters (such as methyl acrylic, ethyl acrylic, n-propyl acrylic, isopropyl acrylic, n-butyl acrylic, n-hexyl acrylic and n-octyl acrylic), methacrylic acid and its esters (such as methyl methacrylic, ethyl methacrylic, n-propyl methacrylic, isopropyl methacrylic, n-butyl methacrylic, isobutyl methacrylic, n-amyl methacrylic and n-octyl methacrylic); and copolymers of them with, for example, styrene, acrylonitrile, butadiene or isoprene. Methyl methacrylic homopolymer and copolymers comprising methyl methacrylic as the main component and an acrylic ester, methacrylic ester (other than methyl methacrylic), styrene or acrylonitrile are preferably used.

The amount of the acrylic resin component (C) that is used in the compositions of the present invention is preferably between 1 to 40 wt. %, particularly between 5 to 30% wt. %, based on the entire weight of the composition. When an insufficient amount of acrylic resin is used, little (if any) weather-resistance effects (particularly prevention of surface cracks) are achieved. On the contrary, when the amount of acrylic resin used is excessive, mechanical and thermal stability properties are detrimentally affected.

Although the weather resistance of polaycetal resin is improved somewhat by using the combination of the acrylic resin component (C) and the UV-light stabilizer component (B), many of the above-described problems (such as decreased mechanical properties and inferior moldability) are not solved.

Thus, the compositions of the present invention are especially characterized in that they further contain (D) an oxyalkylene polymer comprised of repeating oxyalkylene units each having 2 to 8 adjacent carbon atoms.

It has thus been found that the combination of the four components (A), (B), (C) and (D) effectively improves the weather resistance (particularly by maintaining the surface gloss characteristics and preventing surface crack formation) without impairing the other well-balanced properties generally attributable to polyacetal resin.

Specific examples of oxyalkylene polymers comprised of oxyalkylene units each having 2 to 8 adjacent carbon atoms that may be used in the compositions of the present invention include poly(ethylene oxide), poly(propylene oxide), poly(butylene 1,2-oxide), polyoxolane, polyoxane, polyoxepane, polyoxocane and polyoxonane, as well as copolymers of ethylene oxide/propylene oxide and ethylene oxide/oxolane. The copolymers herein refer to random copolymers, block copolymers, graft copolymers, and mixtures thereof. The number-average molecular weight of the oxyalkylene polymer used is usually between 500 to 200,000 and preferably between 4,000 to 50,000. Oxyalkylene polymers in which the oxyalkylene units thereof are each composed of 2 to 4 adjacent carbon atoms are particularly preferred, and include poly(oxyethylene), poly(propylene oxide), poly(butylene 1,2-oxide), polyoxolane and ethylene oxide/propylene oxide copolymer. Particularly preferred are poly(ethylene oxide), poly(propylene oxide) and ethylene oxide/propylene oxide copolymer.

The amount of the oxyalkylene polymer (D) used is between 0.1 to 10% by weight, preferably between 1 to 10% by weight, and particularly between 2 to 6% by weight, based on the entire weight of the composition. When used in amounts less than 0.1% by weight, insufficient improvements in the weather resistance properties ensue. On the other hand, when used in amounts exceeding 10% by weight, maximum improvements in the weather-resistance effects have been achieved and thus a deleterious influence is exerted on the essential properties of the polyacetal resin.

The improvements in the weather resistance properties that are observed are not significantly remarkably improved when the oxyalkylene polymer (D) is added to the polyacetal resin alone, or in combination with either the weather stabilizer component (B) or the acrylic resin component (C). However, synergistic effects are obtained when all three components (A+B+C) are used to thereby inhibit surface crack formation, maintain surface gloss, and minimize the extent of discoloration.

It is presumed that these beneficial effects are obtained because the oxyalkylene polymer is compatible with both of the polyacetal base resin and the acrylic resin. The oxyalkylene component is thus believed to improve the fluidity of the acrylate resin component (C) so as to facilitate its migration to and localization at the surface of molded parts during the molding operation. As a result, the weather resistance properties are significantly improved and, in addition, tensile strength, Izod impact strength, and the like are improved due to the small amount of acrylic resin that is present.

The composition of the present invention desirably further contains known stabilizers in order to further improve thermal stability properties. It is desirable for this purpose to use one or a combination of two or more compounds selected from the group consisting of known antioxidants, nitrogen-containing compounds and alkali or alkaline earth metal compounds.

The compositions of the present invention can also be colored by adding a suitable colorant such as carbon black, dyes, or pigments. The combination of the weather stabilizer and carbon black is particularly effective in further improving the weather stability of the polyacetal compositions which include such components.

The compositions of the present invention may further contain known additives in order to obtain properties that may be desired for particular end-use applications. Suitable additives include, for example, lubricants, nucleating agents, mold release agents, antistatic agents, surfactants, organic polymeric materials, and inorganic or organic, fibrous, granular or platy fillers. These additives can be used either alone or as a combination of two or more of the same.

The compositions of the present invention can be produced by known processing techniques using known apparatus typically employed in the production of synthetic resin compositions. For example, the necessary components can be mixed together, kneaded and then extruded with a single-screw or twin-screw extruder to form pellets. These pellets can then be molded to form articles. The preparation of the composition can be conducted simultaneously with the molding operation using a molding machine. Alternatively, a part or the entirety of the resin components may be pulverized in order to facilitate their dispersion and mixing. The components are then mixed and melt-extruded to form pellets.

The stabilizer and the additives may be added in any step of the process. They are typically added, however, immediately before the molded articles are formed—i.e., prior to producing the final product. The resin compositions of the present invention can be molded by any conventional molding technique including extrusion, injection, compression, vacuum, blow and foam molding processes.

Molded articles formed of the compositions of the present invention exhibit significantly improved surface conditions. Particularly, molded articles of the present invention exhibit increased crack formation time, higher gloss retention, and lesser discoloration when exposed to ultraviolet rays for prolonged time periods as compared to conventional compositions.

Therefore, the weather-resistant polyacetal resin compositions of the present invention are suitably used as a material for molded parts in those fields in which excellent weather (light) resistance properties are required. In particular, the compositions of this invention may be used as a materials to form parts that will be exposed to solar rays, rain and air for long periods of time, such as exterior parts of automobiles (for example, outer handles, fuel lids, wheel covers, front fenders and spoilers), interior parts of automobiles (for example, inner handles and regulator handles), electric appliances, cameras, industrial parts, construction materials, and household goods.

EXAMPLES

The following nonlimiting Examples will further illustrate the present invention.

In the following Examples, the characteristic values such as weather (light) resistance were determined by the following methods:

(1) Weather resistance tests (A and B)

The crack formation time and changes i the surface conditions were evaluated with the following two types of weatherometers:

Test A: The test pieces were irradiated with ultraviolet rays on an ultra-accelerated weatherometer (SUV-W-11; mfd. by Iwasaki Electric Co., Ltd.) in an atmosphere at 83° C. and the weather resistance thereof was evaluated.

Test B: The test pieces were irradiated with ultraviolet rays with a weatherometer (WBL-SUN-HCH; mfd. by Suga Test Instruments Co., Ltd.) having a rain spray at 63° C. and the weather resistance thereof was evaluated.

(i) Crack formation time

The test pieces were irradiated with ultraviolet rays with the above-described weatherometers under predetermined conditions for a predetermined time. The surfaces of the test pieces were observed with a magnifying lens at 10x magnification to confirm the crack formation. The "crack formation time" was the time at which the crack formation began. A higher value thereof suggests better weather resistance.

(ii) Changes in gloss characteristics

The test pieces were irradiated with ultraviolet rays with the same weatherometers as those described above for a predetermined period of time. Changes in the gloss characteristics of the test pieces after the irradiation were observed. The extent of the changes was classified into five groups as will be described below, with a smaller number being indicative of lesser change, i.e., less impairment to the gloss characteristics.

"Gloss" was determined with a digital variable-angle glossmeter (UGV-4D; mfd. by Suga Test Instruments Co., Ltd.). The extend to which the gloss was reduced was determined on the basis of retention of the initial gloss.

| Extent of change | Gloss retention (%) |
| --- | --- |
| 1 | 100–85 |
| 2 | 85–70 |
| 3 | 70–50 |
| 4 | 50–20 |
| 5 | 20–0 |

(2) Evaluation of properties

Tensile elongation: according to ASTM D 638 Izod impact strength (notched): according to ASTM D 256.

EXAMPLES 1 TO 16 AND COMPARATIVE EXAMPLES 1 to 12

A weather (light) stabilizer (B), an acrylic resin (C), an oxyalkylene polymer (D) and, if necessary, carbon black were added to a polyacetal resin (A) (trade name: Duracon (M90); a product of Polyplastics Co., Ltd.) as shown in Table 1 to obtain a mixture. The mixture was melt-kneaded with a 30 mm double-screw extruder to form a composition in pellet form. The pellets were then molded into test pieces with an injection molding machine to evaluate the weather resistance and other characteristics of them. For comparison, the same procedure as above was repeated except that the weather (light) stabilizer was used alone or in combination with either the resin (C) or the oxyalkylene polymer (D) (and, if necessary, carbon black).

TABLE 1

| | | Example | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| (A) Polyacetal resin | note 1 | 84.4 | 84.4 | (20) 84.4 | (30) 74.4 | (10) 77.4 | 64.4 | 84.4 | (20) 74.4 | 74.4 | 74.4 | 84.4 | 84.4 | 83.9 | 73.9 | 83.9 | 88.9 |
| (B) Weather (light) stabilizer | | B-1 | — | B-1 | B-1 | B-1 | B-1 | B-1 | B-1 | B-1 | B-1 | B-2 | B-1 | B-1 | B-1 | B-1 | B-1 |
| | (wt.%) | (0.6) | | (0.3) | (0.3) | (0.3) | (0.3) | (0.3) | (0.3) | (0.3) | (0.3) | (0.3) | (0.3) | (0.3) | (0.3) | (0.3) | (0.3) |
| | note 2 | — | B-3 | B-3 | B-3 | B-3 | B-3 | B-3 | B-3 | B-3 | B-3 | B-3 | B-4 | B-3 | B-3 | B-3 | B-3 |
| | (wt.%) | | (0.6) | (0.3) | (0.3) | (0.3) | (0.3) | (0.3) | (0.3) | (0.3) | (0.3) | (0.3) | (0.3) | (0.3) | (0.3) | (0.3) | (0.3) |
| (C) Acrylate resin | note 3 | C-1 | C-1 | C-1 | C-1 | C-1 | C-1 | C-1 | C-1 | C-1 | C-2 | C-1 | C-1 | C-1 | C-1 | C-1 | C-1 |
| | (wt.%) | (10) | (10) | (10) | (20) | (30) | (10) | (20) | (20) | (20) | (10) | (10) | (10) | (10) | (20) | (10) | (10) |
| (D) Oxyalkylene polymer | note 4 | D-1 | D-1 | D-1 | D-1 | D-1 | D-1 | D-2 | D-2 | D-3 | D-1 | D-1 | D-1 | D-1 | D-1 | D-2 | D-1 |
| | (wt.%) | (5) | (5) | (5) | (5) | (5) | (5) | (5) | (5) | (5) | (5) | (5) | (5) | (5) | (5) | (5) | (0.5) |
| Carbon black | (wt.%) | — | — | — | — | — | — | — | — | — | — | — | — | 0.5 | 0.5 | 0.5 | — |
| Weather resistance test (A) | crack formation time (h) | 80 | 60 | 150 | 180 | 150 | 240 | 140 | 170 | 180 | 160 | 130 | 130 | 290 | 350 | 280 | 180 |
| | change in gloss 100 h | 2 | 2 | 1 | 1 | 1 | 1 | 1 | 2 | 1 | 2 | 2 | 2 | 1 | 1 | 1 | 2 |
| | 200 h | 3 | 3 | 2 | 3 | 2 | 2 | 2 | 3 | 2 | 3 | 3 | 4 | 1 | 1 | 1 | 3 |
| | 100 h | 5 | 5 | 4 | 4 | 4 | 4 | 4 | 4 | 4 | 4 | 4 | 4 | 2 | 2 | 2 | 5 |
| Weather resistance test (B) | crack formation time (h) | 960 | 720 | 1440 | 1660 | 1560 | 1920 | 1480 | 1880 | 1940 | 1600 | 1080 | 1320 | 2120 | 2640 | 2400 | 1020 |
| | 600 h | 1 | 1 | 1 | 1 | 1 | 1 | 1 | 1 | 1 | 2 | 2 | 1 | 1 | 1 | 1 | 2 |
| | 1000 h | 2 | 3 | 2 | 2 | 2 | 2 | 2 | 2 | 2 | 3 | 3 | 2 | 1 | 1 | 1 | 4 |
| | 2000 h | 4 | 5 | 3 | 4 | 4 | 4 | 4 | 4 | 4 | 4 | 4 | 4 | 2 | 2 | 2 | 4 |
| Tensile elongation (%) | | 90 | 87 | 83 | 39 | 33 | 18 | 78 | 42 | 38 | 32 | 80 | 88 | 70 | 20 | 63 | 35 |
| Izod impact strength (kg·cm/cm) | | 4.4 | 4.8 | 4.2 | 3.1 | 2.6 | 2.1 | 4.2 | 2.9 | 3.0 | 2.8 | 4.1 | 4.2 | 3.6 | 2.4 | 3.5 | 4.1 |

| | | Comparative Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| (A) Polyacetal resin | note 1 | 89.4 | 89.4 | 99.4 | 94.4 | 89.4 | 79.4 | 69.4 | 79.4 | 89.4 | 89.4 | 88.9 | 78.9 |
| (B) Weather (light) stabilizer | | B-1 | — | B-1 | B-1 | B-1 | B-1 | B-1 | B-1 | B-2 | B-1 | B-1 | B-1 |
| | (wt.%) | (0.6) | | (0.3) | (0.3) | (0.3) | (0.3) | (0.3) | (0.3) | (0.3) | (0.3) | (0.3) | (0.3) |
| | note 2 | — | B-3 | B-3 | B-3 | B-3 | B-3 | B-3 | B-3 | B-3 | B-4 | B-3 | B-3 |
| | (wt.%) | | (0.6) | (0.3) | (0.3) | (0.3) | (0.3) | (0.3) | (0.3) | (0.3) | (0.3) | (0.3) | (0.3) |
| (C) Acrylate resin | note 3 | C-1 | C-1 | — | — | C-1 | C-1 | C-1 | C-2 | C-1 | C-1 | C-1 | C-1 |
| | (wt.%) | (10) | (10) | | | (10) | (20) | (30) | (20) | (10) | (10) | (10) | (20) |
| (D) Oxyalkylene polymer | note 4 | — | — | — | D-1 | — | — | — | — | — | — | — | — |
| | (wt.%) | | | | (5) | | | | | | | | |
| Carbon black | (wt.%) | — | — | — | — | — | — | — | — | — | — | 0.5 | 0.5 |
| Weather resistance test (A) | crack formation time (h) | 40 | 35 | 35 | 35 | 60 | 80 | 140 | 70 | 60 | 60 | 120 | 200 |
| | change in gloss 100 h | 3 | 3 | 3 | 3 | 3 | 2 | 1 | 3 | 3 | 3 | 2 | 1 |
| | 200 h | 5 | 5 | 4 | 4 | 5 | 4 | 2 | 4 | 4 | 5 | 4 | 2 |
| | 300 h | 5 | 5 | 5 | 5 | 5 | 5 | 5 | 5 | 5 | 5 | 5 | 4 |
| Weather resistance test (B) | crack formation time (h) | 420 | 400 | 380 | 400 | 600 | 720 | 1260 | 720 | 600 | 540 | 1020 | 1600 |
| | 600 h | 2 | 2 | 2 | 2 | 2 | 2 | 1 | 2 | 2 | 2 | 1 | 1 |
| | 1000 h | 5 | 5 | 5 | 5 | 3 | 4 | 3 | 4 | 5 | 5 | 3 | 2 |
| | 2000 h | 5 | 5 | 5 | 5 | 5 | 5 | 5 | 5 | 5 | 5 | 5 | 5 |
| Tensile elongation (%) | | 31 | 33 | 74 | 95 | 25 | 14 | 8 | 18 | 27 | 25 | 16 | 10 |

TABLE 1-continued

| Izod impact strength (kg · cm/cm) | 3.8 | 4.2 | 5.9 | 5.5 | 4.0 | 3.9 | 3.2 | 3.4 | 3.4 | 3.7 | 3.4 | 3.3 | 3.8 |

NOTES FOR TABLE 1
Note 1
B-1: 2-[2-hydroxy-3,5-bis(α,α-dimethyl-benzyl)phenyl]benzotriazole
B-2: 2-hydroxy-4-oxybenzylbenzophenone
Note 2
B-3: bis(2,2,6,6-tetramethyl-4-piperidyl) sebacate
B-4: dimethyl succinate/1-(2-hydroxyethyl)-4-hydroxy-2,2,6,6-tetramethylpiperidine polycondensate
Note 3
C-1: methyl methacrylate resin [average molecular weight 60,000]
C-2: methyl methacrylate resin [average molecular weight 20,000]
Note 4
D-1: poly(ethylene oxide) [average molecular weight 20,000]
D-2: poly(ethylene oxide) [average molecular weight 50,000]
D-3: poly(propylene oxide) [average molecular weight 6,000]

What is claimed is:

1. A weather-resistant polyacetal molding composition comprising a polyacetal base resin consisting essentially of repeating oxymethylene units, and a weather-resistant effective amount of a stabilization package which includes (i) a weather stabilizer for the polyacetal base resin, (ii) an acrylic resin, and (iii) an oxyalkylene polymer which is at least one polymer selected from the group consisting of poly(ethylene oxide) and ethylene oxide/propylene oxide copolymers, and wherein said oxyalkylene polymer is compatible with said polyacetal base resin and said cacrylic resin to facilitate migration to and localization at the surface of molded articles of said acrylic resin during a molding operation to form said molded articles from said molding composition, wherein said molding composition is rendered weather-resistant.

2. A weather-resistant polyacetal composition comprising, based on the total composition weight, (A) between 45 to 98.89 wt. % of a polyacetal base resin consisting essentially of repeating oxymethylene units, (B) between 0.01 to 5 wt. % of a weather stabilizer, (C) between 1 to 40 wt. % of an acrylic resin, and (D) between 0.1 to 10 wt. % of an oxyalkylene polymer which is at least one polymer selected from the group consisting of poly(ethylene oxide) and ethylene oxide/propylene oxide copolymers, and wherein said oxyalkylene polymer is compatible with said polyacetal base resin and said acrylic resin to facilitate migration to and localization at the surface of molded articles of said acrylic resin during a molding operation to form said molded articles from said molding composition, wherein said molding composition is rendered weather-resistant.

3. A weather-resistant polyacetal resin composition according to claim 1 or 2, wherein the acrylic resin is a methyl acrylate homopolymer or a copolymer mainly comprising methyl methacrylate.

4. A weather-resistant polyacetal resin composition according to claim 1 or 2 wherein the weather stabilizer is one or more compounds selected from the group consisting of benzotriazoles, benzophenones, aromatic benzoates, cyanoacrylates, oxalanilides and hindered amines.

5. A weather-resistant polyacetal resin composition according to claim 1 or 2 wherein the weather stabilizer comprises a combination of (1) at least one compound selected from benzotriazoles, benzophenones, aromatic benzoates, cyanoacrylics and oxalanilides, and (2) a hindered amine.

6. The composition in claim 1 or 2 wherein the oxyalkylene polymer is present in an amount between 1 to 10% by weight.

7. Molded articles formed of a weather-resistant polyacetal resin composition as in claim 1 or 2.

8. A molded article exhibiting improved weather and impact resistance properties which is formed of a polyacetal molding composition comprising, based on the total composition weight:

(A) between 45 to 98.89 wt. % of a polyacetal base resin which consists essentially of repeating oxymethylene units, (B) between 0.01 to 5 wt. % of a weather stabilizer, (C) between 1 to 40 wt. % of an acrylic resin, and (D) between 0.1 to 10 wt. % of an oxyalkylene polymer which is at least one polymer selected from the group consisting of poly(ethylene oxide) and ethylene oxide/propylene oxide copolymers, and wherein said oxyalkylene polymer is compatible with said polyacetal base resin and said acrylic resin to facilitate migration to and localization at the surface of molded articles of said acrylic resin during molding operation to form said molded articles from said molding composition, wherein said molding composition is rendered weather-resistant, and wherein said acrylic resin component (C) is localized at the surface of said molded part to thereby obtain said improved weather and impact resistance properties due to said polymer component (D) allowing migration of said acrylic resin component (C) to said surface of said molded part during molding.

9. A molded article according to claim 8, wherein the acrylic resin is a methyl acrylate homopolymer or a copolymer mainly comprising methyl methacrylate.

10. A molded article according to claim 8, wherein the weather stabilizer is one or more compounds selected form the group consisting of benzotriazoles, benzophenones, aromatic benzoates, cyanoacrylates, oxalanilides and hindered amines.

11. A molded article according to claim 8, wherein the weather stabilizer comprises a combination of (1) at least one compound selected from benzotriazoles, benzophenones, aromatic benzoates, cyanoacrylates and oxalanilides, and (2) a hindered amine.

* * * * *

UNITED STATES PATENT AND TRADEMARK OFFICE
CERTIFICATE OF CORRECTION

PATENT NO. : 5,118,734

DATED : June 2, 1992

INVENTOR(S) : KATSUMATA

It is certified that error appears in the above-identified patent and that said Letters Patent is hereby corrected as shown below:

Title page, item [57]

Under Abstract, first line, change "resistantt" to --resistant--;
second line, before "comprised" change "are" to --is--.

Column 1, line 62, after "As a result," delete "an increase in".

Column 3, line 2, change "methocy" to --methoxy--.

Column 6, line 3, change "i" to --in--;
line 37, after "The" change "extend" to --extent--.

Signed and Sealed this

Nineteenth Day of October, 1993

Attest:

BRUCE LEHMAN

*Attesting Officer*  *Commissioner of Patents and Trademarks*